United States Patent
Kim et al.

(10) Patent No.: US 9,274,634 B2
(45) Date of Patent: Mar. 1, 2016

(54) TOUCH PANEL

(71) Applicant: LG INNOTEK CO., LTD., Seoul (KR)

(72) Inventors: Byung Soo Kim, Seoul (KR); Jong Il Kim, Seoul (KR); Ji Won Jo, Seoul (KR); Hyuk Jin Hong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 236 days.

(21) Appl. No.: 13/906,827

(22) Filed: May 31, 2013

(65) Prior Publication Data

US 2013/0322042 A1   Dec. 5, 2013

(30) Foreign Application Priority Data

May 31, 2012   (KR) .................. 10-2012-0058911

(51) Int. Cl.
*G06F 3/041* (2006.01)

(52) U.S. Cl.
CPC .............. *G06F 3/0412* (2013.01); *G06F 3/041* (2013.01); *G06F 2203/04103* (2013.01)

(58) Field of Classification Search
CPC .............................. G06F 3/041; G06F 3/0412
USPC ............ 361/748; 174/250, 251, 256; 345/173
See application file for complete search history.

(56) References Cited

U.S. PATENT DOCUMENTS

| | | | | |
|---|---|---|---|---|
| 8,717,330 | B2 * | 5/2014 | Lu et al. ................. | 345/174 |
| 2011/0304578 | A1 * | 12/2011 | Kim et al. ............. | G06F 3/044 345/174 |
| 2013/0194220 | A1 * | 8/2013 | Lee et al. ................ | 345/173 |
| 2013/0241857 | A1 * | 9/2013 | Chung ................. | G06F 3/041 345/173 |
| 2013/0308316 | A1 * | 11/2013 | Kim et al. .............. | 362/253 |
| 2015/0084917 | A1 * | 3/2015 | Kim .................. | G06F 3/044 345/174 |
| 2015/0114816 | A1 * | 4/2015 | Kim .................. | G06F 3/044 200/600 |
| 2015/0130760 | A1 * | 5/2015 | Kim .................. | G06F 3/044 345/174 |
| 2015/0212539 | A1 * | 7/2015 | Hong ................. | G06F 3/041 345/174 |
| 2015/0220193 | A1 * | 8/2015 | Choe ................. | G06F 3/044 345/174 |

FOREIGN PATENT DOCUMENTS

WO   WO 2012015284 A2 *   2/2012

* cited by examiner

*Primary Examiner* — Jeremy C Norris
*Assistant Examiner* — Nathan Milakovich
(74) *Attorney, Agent, or Firm* — Saliwanchik, Lloyd & Eisenschenk

(57) ABSTRACT

Disclosed is a touch panel. The touch panel includes a substrate including a view area and a dead area; a bridge electrode on the view area of the substrate; a print part on the dead area of the substrate; a wire electrode formed on the printed part to make direct contact with the print part; and an insulation pattern on the bridge electrode and the wire electrode.

15 Claims, 2 Drawing Sheets

TOUCH PANEL

CROSS-REFERENCE TO RELATED APPLICATION

This application claims the benefit under 35 U.S.C. §119 of Korean Patent Application No. 10-2012-0058911, filed May 31, 2012, which is hereby incorporated by reference in its entirety.

BACKGROUND

A touch panel, which is installed on a display surface of an image display device such as a cathode ray tube (CRT), a liquid crystal display (LCD), a field emission display (FED), a plasma display panel (PDP), and an electro-luminescence device (ELD), serves a device for allowing a user to input predetermined information to a computer while the user views the image display device. Recently, the touch panel has been widely used for a communication terminal such as a smart phone or a touch phone.

FIGS. 1 to 4 are sectional views illustrating a method of fabricating a touch panel according to the related art.

According to the related art, as shown in FIG. 1, a bridge electrode 120 including ITO (Indium Tin Oxide) is formed on a transparent window 110 in order to fabricate the touch panel. The bridge electrode 120 is formed on a view area through which a touch instruction is input on the transparent window 110 of the touch panel. A deco print part 130 is formed on a dead area.

Then, as shown in FIG. 2, an insulation material is coated on the bridge electrode 120 and the deco print part 130 such that insulation patterns 125 and 135 are formed, respectively.

An Rx and Tx sensing electrodes pattern 140 formed of an ITO material and a metal wire 150 are formed on the insulation patterns 125 and 135 describe above, respectively.

Then, a second insulation pattern 160 for protecting the metal wire 150 is formed such that the metal wire 150 is prevented from being open circuited and oxidized.

However, according to the related art, an additional process is required for forming the second insulation pattern 160 for protecting the metal wire 150, so that the production cost is increased.

To solve the above-described problems, there is a need of a touch panel having a new structure.

BRIEF SUMMARY

The embodiment provides a touch panel having a new structure, by which insulation patterns are simultaneously formed on a bridge electrode and a metal wire portion when fabricating the touch panel, so that the process may be simplified and the fabrication cost of the touch panel may be reduced.

According to an embodiment, there is provided a touch panel including a substrate including a view area and a dead area; a bridge electrode on the view area of the substrate; a print part on the dead area of the substrate; a wire electrode formed on the printed part to make direct contact with the print part; and an insulation pattern on the bridge electrode and the wire electrode.

According to another embodiment, there is provided a touch panel including a substrate including a view area and a dead area; a bridge electrode on the view area of the substrate; a print part on the dead area of the substrate; a wire electrode on the printed part; and an insulation pattern on the bridge electrode and the wire electrode, wherein the insulation pattern comprises a first insulation pattern on the bridge electrode and a second insulation pattern on the wire electrode, and the first and second insulation patterns comprises a same material.

According to the embodiment, a touch panel having a new structure can be fabricated, in which the insulation patterns can be simultaneously formed on a bridge electrode and a metal wire portion when fabricating the touch panel, so that the process can be simplified and the process efficiency can be improved, thereby reducing the fabrication cost of the touch panel.

DETAILED DESCRIPTION

Figure 1:
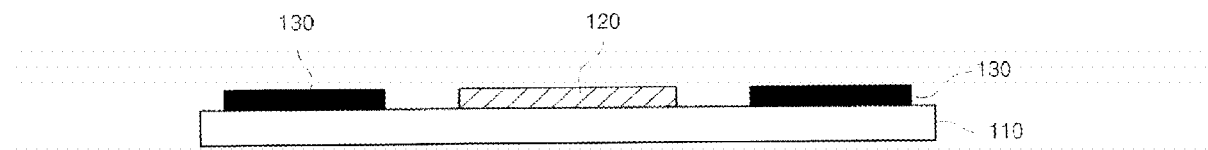
FIGS. 1 to 4 are sectional views illustrating a touch panel according to the related art.
Figure 2:
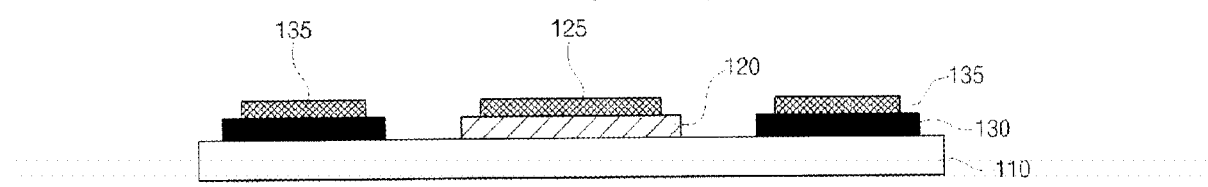
Figure 3:
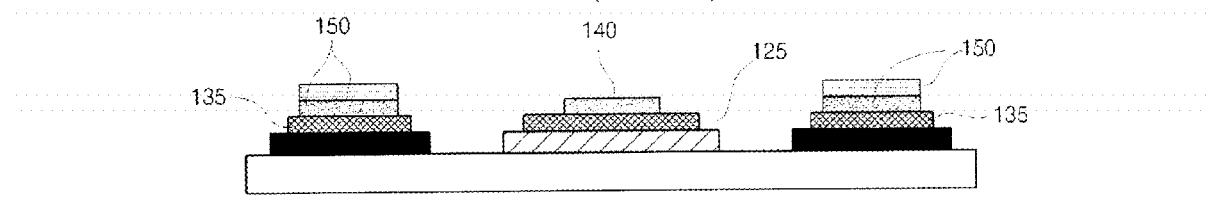
Figure 4:
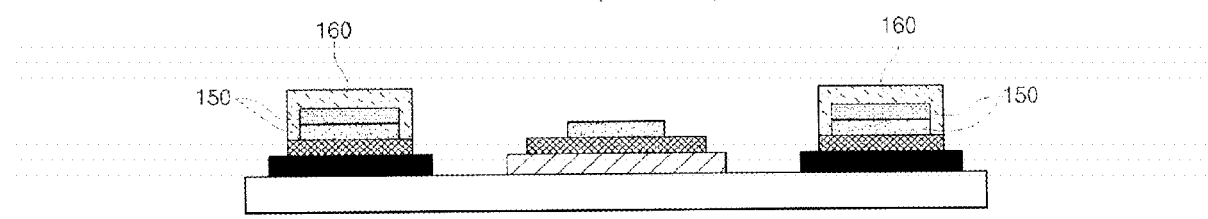

Hereinafter, the embodiment will be described with reference to accompanying drawings in detail. Detailed descriptions of well-known functions and structures incorporated herein may be omitted when they make the subject matter rather unclear. The size of the elements shown in the drawings may be exaggerated for the purpose of explanation and may not utterly reflect the actual size.

Figure 5:
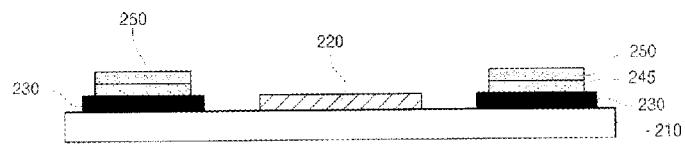
FIGS. 5 to 7 are sectional views illustrating a touch panel according to the embodiment.
Figure 6:
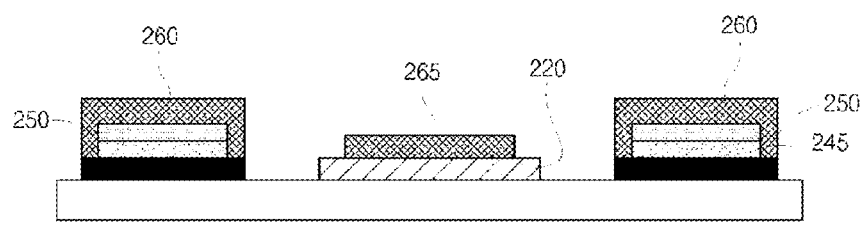
Figure 7:
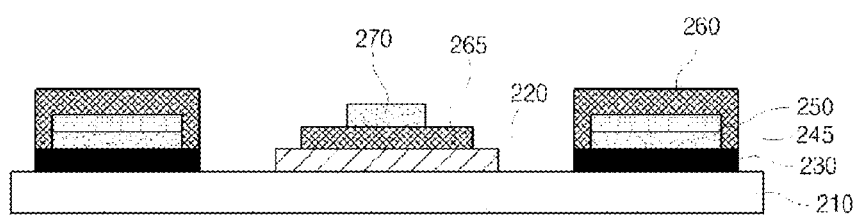

FIGS. 5 to 7 are sectional views illustrating a touch panel according to the embodiment.

Hereinafter, the touch panel and method of fabricating the same according to the embodiment will be described with reference to FIGS. 5 to 7.

Referring to FIG. 5, according to the method of fabricating a touch panel according to the embodiment, a bridge electrode 220 and a print part 230 are formed on a substrate 210. A wire electrode is formed on the print part 230.

The substrate 210 includes glass or plastic. For example, the substrate 210 may include glass such as strengthened glass, half-strengthened glass or sodalime glass, or plastic such as PET or strengthened plastic.

The bridge electrode 220 is formed in a view area of the substrate 210. For example, the bridge electrode 220 may include an electrode material such as ITO. However, the embodiment is not limited to the above, and the bridge electrode 220 may include at least one of IZO (Indium Zinc Oxide), ZnO (Zinc Oxide), CNT (Carbon Nano Tube), an Ag nano wire, conductive polymer and graphene.

The print part 230 may be formed on a dead area of the substrate 210. The print part 230 may be formed in at least one layer. A material for forming a wire electrode is provided on the print part 230. For example, the wire electrode may include a first wire electrode 245 and a second wire electrode 250 formed on the first wire electrode 245.

The view area according to the embodiment signifies an area through which a touch instruction of a user may be input. In addition, the dead area according to the embodiment has the concept opposite to that of the view area through which a touch instruction of a user may be input, that is, the dead area is not activated even if a user touches the dead area, so the dead area signifies an area through which any touch instructions cannot be input.

The first wire electrode 245 may include the same material as that of the bridge electrode. However, the embodiment is not limited to the above, and the first wire electrode 245 may be formed by depositing various electrode materials.

The second wire electrode 250, which may be formed on the first wire electrode 245, may include a metallic material. For example, the second wire electrode 250 may include at least one of Ag and Mo.

The bridge electrode 220 and the first wire electrode 245 may be formed at the same time. In detail, after the print part 230 is formed on the dead area of the substrate 210, an electrode material such as ITO is simultaneously deposited on the print part 230 and the view area of the substrate 210, so that the first wire electrode 245 and the bridge electrode 220 are simultaneously formed. Then, a metallic material may be deposited on the electrode material formed on the print part 230, so that the second wire electrode 250 may be formed.

Referring to FIG. 6, an insulation material is formed on the bridge electrode 220 and the wire electrode.

In detail, a first insulation pattern 265 may be formed by coating an insulation material on the bridge electrode 220. Further, a second insulation pattern 260 may be formed by coating an insulation material on the wire electrode.

The first and second insulation patterns 265 and 260 may be simultaneously formed. In detail, the insulation patterns may be simultaneously formed on the bridge electrode 220 and the wire electrode by simultaneously coating the insulation material on the bridge electrode 220 and the wire electrode.

Since the first and second insulation pattern 265 and 260 may be formed on the bridge electrode 220 and the wire electrode by simultaneously coating the insulation material on the bridge electrode 220 and the wire electrode, the first and second insulation patterns 265 and 260 may include the same material.

The second insulation pattern 260 may be formed while surrounding the wire electrodes. In detail, as shown in FIG. 6, the insulation material 260 may be formed to make direct contact with the top and side surfaces of the first wire electrode 245 and the side surface of the second wire electrode 250. Thus, the first and second wire electrodes 245 and 250 may not be exposed so that the oxidation and disconnection of the wire electrodes may be prevented.

Referring to FIG. 7, the sensing electrode 270 is formed by coating an electrode material on the bridge electrode 220. The sensing electrode 270 may include the same material as that of the bridge electrode 220. For example, the sensing electrode may be formed of at least one of ITO, IZO, ZnO, CNT, an Ag nano wire, conductive polymer and graphene.

According the method of fabricating a touch panel of the embodiment, the insulation material is simultaneously coated on the bridge electrode and the wire electrode, so that the first and second insulation patterns may be formed at the same time.

According to the related art, an insulation material such as a protection layer for protecting the wire electrode is formed after the insulation material is formed on a print layer and then, a wire electrode is formed, so that the number of processes is increased.

According to the method of fabricating a touch panel of the embodiment, since an additional process of forming the insulation pattern on the wire electrode is omitted, the process efficiency can be improved. In addition, the embodiment provides a touch panel having a new structure by which the process cost can be reduced.

Hereinafter, a touch panel according to the embodiment will be described with reference to FIG. 7. The description of the touch panel according to the embodiment refers to the above description of the method of fabricating a touch panel. That is, the description of the touch panel according to the embodiment may be incorporated with the description of the method of fabricating a touch panel.

The touch panel according to the embodiment includes the substrate 210, the bridge electrode 220 formed on the view area of the substrate 210, the print part 230 formed on the dead area of the substrate 210, the wire electrode formed on the print part 230, and the insulation pattern formed on the bridge electrode and the wire electrode.

The insulation pattern may include the first insulation pattern 265 formed on the bridge electrode 220 and the second insulation pattern 260 formed on the wire electrode.

The first and second insulation patterns 265 and 260 may include the same material. In detail, the first and second insulation patterns 265 and 260 may include the same insulation material. In more detail, the first and second insulation patterns 265 and 260 may be simultaneously formed of the same material.

The wire electrode disposed on the print part includes the first wire electrode 245 and the second wire electrode 250 disposed on the first wire electrode 245. The first bridge electrode and the first wire electrode may include the same material, in detail, the bridge electrode and the first wire electrode may include an electrode material such as ITO. However, the embodiment is not limited to the above, and the bridge electrode and the first wire electrode may include at least one of IZO (Indium Zinc Oxide), ZnO (Zinc Oxide), CNT, an Ag nano wire, conductive polymer and graphene. In more detail, the bridge electrode and the first wire electrode may be simultaneously formed of the same material.

Further, the wire electrode may be formed to make direct contact with the print part 230. In detail, the first wire electrode 245 may formed to make direct contact with the print part 230 and the second wire electrode 250 may be formed on the first wire electrode 245.

In addition, the insulation pattern may be formed to surround the wire electrode. In detail, the insulation pattern may be formed to make direct contact with the top and side surfaces of the wire electrode. In more detail, the second insulation pattern 260 may be formed to make direct contact with the top and side surfaces of the first wire electrode 245 and the side surface of the second wire electrode 250. Thus, the first and second wire electrodes 245 and 250 may not be exposed to an outside, so that the oxidation and disconnection of the wire electrodes may be prevented.

According to the touch panel of the embodiment, the insulation patterns may be simultaneously formed on the bridge electrode and the wire electrode.

According to the related art, the insulation pattern is finally formed on the wire electrode after the insulation pattern is formed on the print part and the insulation pattern is formed on the bridge electrode. However, the touch panel having the novel structure according to the embodiment can be effectively manufactured without degrading the reliability and quality thereof by forming the wire electrodes which mike direct contact with the print part on the print part and then simultaneously forming the insulation patterns on the bridge electrode and the wire electrode by using the same insulation material.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A touch panel comprising:
   a substrate including a view area and a dead area;

a bridge electrode on the view area of the substrate;
a print part on the dead area of the substrate;
a wire electrode formed on the printed part to make direct contact with the print part; and
a first insulation pattern on the bridge electrode and a second insulation pattern on the wire electrode,
wherein the first insulation pattern and the second insulation pattern are physically separated from each other, and
wherein the second insulation pattern makes direct contact with the print part.

2. The touch panel of claim 1, wherein the wire electrode comprises:
a first wire electrode making direct contact with the print part; and
a second wire electrode on the first wire electrode.

3. The touch panel of claim 2, wherein the bridge electrode and the first wire electrode comprise at least one of indium tin oxide (ITO), indium zinc oxide (IZO), copper oxide, a carbon nano tube (CNT), and an silver (Ag) nano wire.

4. The touch panel of claim 3, wherein the bridge electrode and the first wire electrode comprise a same material.

5. The touch panel of claim 2, wherein the second wire electrode comprises a metallic material.

6. The touch panel of claim 1, wherein the substrate comprises glass or plastic.

7. The touch panel of claim 2, wherein the second insulation pattern surrounds the first and second wire electrodes.

8. The touch panel of claim 7, wherein the second insulation pattern makes direct contact with side surfaces of the first wire electrode and top and side surfaces of the second wire electrode.

9. The touch panel of claim 7, wherein the second insulation pattern makes direct contact with side surfaces of the first wire electrode and a side surface of the second wire electrode.

10. The touch panel of claim 1, further comprising:
a sensing electrode on the insulation pattern.

11. A touch panel comprising:
a substrate including a view area and a dead area;
a bridge electrode on the view area of the substrate;
a print part on the dead area of the substrate;
a wire electrode on the printed part; and
a first insulation pattern on the bridge electrode and a second insulation pattern on the wire electrode,
wherein the first and second insulation patterns comprise a same material,
wherein the first insulation pattern and the second insulation pattern are physically separated from each other, and
wherein the second insulation pattern makes direct contact with the print part.

12. The touch panel of claim 11, wherein the wire electrode comprises:
a first wire electrode on the print part; and
a second wire electrode on the first wire electrode.

13. The touch panel of claim 12, wherein the first wire electrode makes direct contact with the print part.

14. The touch panel of claim 11, wherein the second insulation pattern surrounds the wire electrode.

15. The touch panel of claim 14, wherein the wire electrode comprises:
a first wire electrode on the print part; and
a second wire electrode on the first wire electrode,
wherein the second insulation pattern makes direct contact with top and side surfaces of the second wire electrode and a side surface of the first wire electrode.

* * * * *